H. A. MOORE.
COMBINED ANIMAL TRAP AND CHICKEN COOP.
APPLICATION FILED MAY 8, 1908.

904,348.

Patented Nov. 17, 1908.

Witnesses
H. H. Cummings
W. Keane Small

Inventor
Henry A. Moore
By Edson Bro's
Attorney

UNITED STATES PATENT OFFICE.

HENRY ALEXANDER MOORE, OF SALADO, TEXAS.

COMBINED ANIMAL-TRAP AND CHICKEN-COOP.

No. 904,348.

Specification of Letters Patent.

Patented Nov. 17, 1908.

Application filed May 8, 1908. Serial No. 431,675.

*To all whom it may concern:*

Be it known that I, HENRY ALEXANDER MOORE, a citizen of the United States, residing at Salado, in the county of Bell and State of Texas, have invented certain new and useful Improvements in a Combined Animal-Trap and Chicken-Coop; and I do hereby declare the following to be a full, clear, and exact description of the invention, such as will enable others skilled in the art to which it appertains to make and use the same.

My invention relates to an improved construction of combined animal trap and chicken coop.

It has for its object to provide an effective means of preventing rats and other animals from killing chickens.

Other objects of the invention will become apparent from the following description.

The invention consists in the novel construction of trap and also in arranging the trap in a compartment of the coop whereby the animals are deceived into believing that they are entering the coop instead of the trap.

The invention also consists in the features of construction and combinations of parts hereinafter described and specified in the claims.

Figure 1:
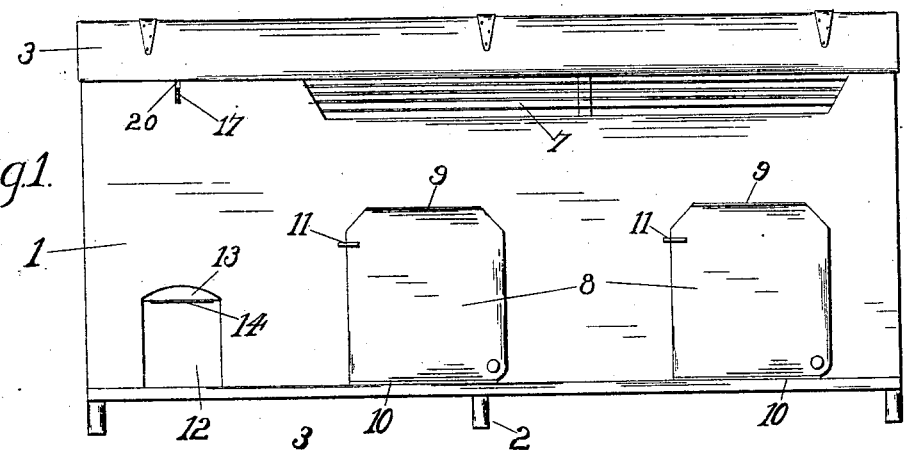
Figure 2:
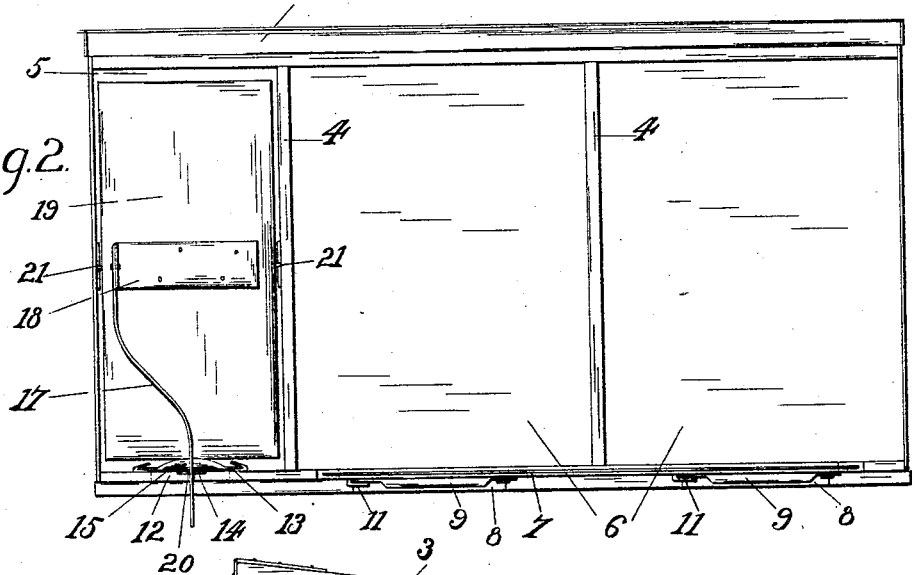
Figure 3:
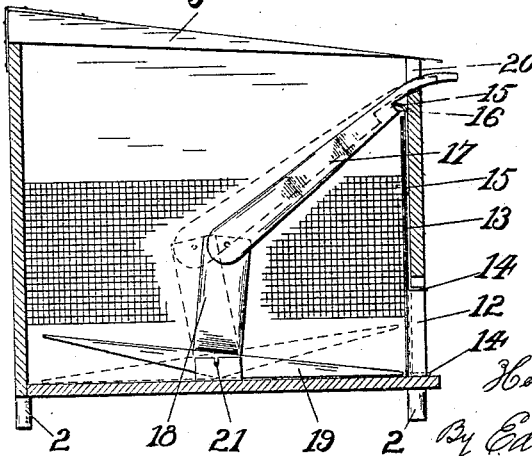

In the accompanying drawings, illustrating the preferred embodiment of my invention: Figure 1 is a front elevation of a closure containing a plurality of coop compartments and one trap compartment, two of said coop compartments being shown. Fig. 2 is a top plan view with the cover raised, and Fig. 3 is a vertical sectional view taken from front to back of the trap compartment showing the set position of the parts in solid lines and the released or sprung positions thereof in dotted lines.

Referring more particularly to the drawings, 1 designates a closure or housing which is preferably raised from the ground upon legs 2 and which is provided with a common hinged cover 3. Partitions 4 extending from front to back divide the interior of the inclosure into a trap compartment 5 and a plurality of coop compartments 6. Said partitions are perforated to permit the animals when entering the trap to see the chickens in the coop compartments. Suitable grated ventilating openings 7 are preferably arranged in the front of the closure over the doors 8 leading to the coop compartments. Each of said doors comprises preferably a rectangular piece of sheet metal which is pivoted at one of its lower corners and adapted to be revolved on said pivot one quarter of a revolution to change it from a closed to an open position or vice versa. Said door is provided with upper and lower bent flanges 9 and 10 respectively, the former serving as a handle for opening and closing the door while the latter acts as a stop when the door is closed. A keeper 11, adapted to engage the free edge of the door prevents said door from being sprung or displaced when closed.

The opening 12 leading to the trap compartment is closed by a vertically sliding door 13 having a handle 14 extending outward from its lower end for convenience in raising said door when it is desired to set the trap. The upper end of the door has a flange 15 formed thereon which extends inward and is adapted to be engaged by a notch 16 in the setting bar 17. Said setting bar is pivotally connected to an upright 18 rigidly secured to the platform 19 over its pivotal axis. The free end of said setting bar extends through the slot 20 in the wall of the closure preferably arranged above the opening 12 whereby access may be had to said setting bar from the outside without raising the cover. The platform 19 is arranged just inside the entrance opening to the trap compartment and is pivoted on an axle 21 arranged transversely of said compartment.

The pivoting of the platform at the middle and placing of the upright 18 over the pivotal axis counterbalances said platform and renders it capable of resting with either end down. If it were not so counterbalanced, and was pivoted near the forward end for instance, some means would have to be supplied for supporting the rear end of said platform when the trap is set. The simplicity of my construction will be appreciated the more because no such supporting mechanism is required.

By reference to Fig. 3, it will be seen that when the forward end of the platform is depressed, the notch in the setting bar is brought into position to engage the flange on the upper end of the door 13 and that when in this position the outer end of said bar projects through the slot 20 to the outside of the front of the closure. When the rat or animal enters the opening 12 and passes over the platform beyond the pivotal axis thereof, its weight will depress the rear end of said platform, causing the upright 18 to oscillate and removing the notch in the setting bar from engagement with the door 13. As soon as the door is thus released it will fall by gravity and close the opening 12.

I claim:

1. An animal trap comprising a closure having an entrance opening and a slot therein, a door adapted to close said opening by gravity when released, an intermediately pivoted and counterbalanced platform arranged within said closure, and a setting bar secured to said platform and adapted to hold said door in an open position when the end of the platform next to the door is down but which releases said door when the other end of said platform is depressed, the free end of said setting bar extending through said slot in the wall of the closure for the purpose specified.

2. An animal trap comprising a closure having an entrance opening and a slot therein, a door adapted to close said opening by gravity when released, an intermediately pivoted platform arranged within said closure, and a setting bar secured to said platform and provided with a notched portion adapted to hold said door in an open position when the end of the platform next to the door is down but which releases said door when the other end of said platform is depressed, said setting bar extending beyond said notched portion thereof through said slot in the closure and projecting outside in both positions of the platform whereby the trap may be set from the outside.

3. An animal trap comprising a closure having an entrance opening and a slot therein, a door adapted to close said opening by gravity when released, an intermediately pivoted counterbalanced platform arranged within said closure, an upright rigidly connected to said platform over its pivotal axis, and a setting bar fastened to said upright and provided with a notched portion adapted to hold said door in an open position when the end of the platform next to the door is down but which releases said door when the other end of said platform is depressed said setting bar extending beyond said notched portion thereof through said slot in the closure and projecting outside in both positions of the platform whereby the trap may be set from the outside.

In testimony whereof, I affix my signature, in presence of two witnesses.

HENRY ALEXANDER MOORE.

Witnesses:
J. E. GUTHIN,
W. BARTON.